US009211781B2

(12) United States Patent
Saiki

(10) Patent No.: US 9,211,781 B2
(45) Date of Patent: Dec. 15, 2015

(54) VEHICLE DOOR

(71) Applicant: HONDA MOTOR CO., LTD., Tokyo (JP)

(72) Inventor: Yuuichirou Saiki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/424,501

(22) PCT Filed: Jun. 7, 2013

(86) PCT No.: PCT/JP2013/065815
§ 371 (c)(1),
(2) Date: Feb. 27, 2015

(87) PCT Pub. No.: WO2014/034220
PCT Pub. Date: Mar. 6, 2014

(65) Prior Publication Data
US 2015/0202948 A1 Jul. 23, 2015

(30) Foreign Application Priority Data

Aug. 31, 2012 (JP) ................................. 2012-190788

(51) Int. Cl.
*B62D 25/04* (2006.01)
*B60J 5/04* (2006.01)
(Continued)

(52) U.S. Cl.
CPC .............. *B60J 5/0411* (2013.01); *B60J 5/0402* (2013.01); *B60J 10/02* (2013.01); *B60J 10/041* (2013.01); *B60R 13/04* (2013.01)

(58) Field of Classification Search
CPC .......... B60J 5/041; B60J 5/0402; B60J 10/02; B60J 10/041; B60R 13/04
USPC .................... 49/502; 296/146.1, 146.2, 146.5
See application file for complete search history.

(56) References Cited

U.S. PATENT DOCUMENTS 5,557,890 A * 9/1996 Levy et al. ...................... 49/502
5,746,471 A * 5/1998 Teramoto et al. .......... 296/146.1
(Continued)

FOREIGN PATENT DOCUMENTS

JP S56-16524 2/1981
JP 56-167514 12/1981
(Continued)

OTHER PUBLICATIONS

International Search Report, Date of mailing: Aug. 13, 2013.

*Primary Examiner* — Jerry Redman
(74) *Attorney, Agent, or Firm* — Rankin, Hill & Clark LLP

(57) ABSTRACT

A vehicle door (10) has a door body (20), a stationary window panel (17) which is provided above the door body (20), a panel support frame (50) which is provided at at least the lower edge of the stationary window panel (17) and which seals between the lower edge and the door body (20), and a decorative belt line molding (30) which is provided at the upper edge of the door body (20) so as to extend therealong. The panel support frame (50) and the belt line molding (30) overlap each other in the thickness direction of the door. The panel support frame (50) has a first support frame-side extension section (54a) which extends in the thickness direction of the door relative to the stationary window panel (17) toward the belt line molding (30). The belt line molding (30) has a design surface section (31) which constitutes the outer surface of the vehicle, and a molding-side extension section (32b) which extends from the design surface section (31) in the thickness direction of the door toward the stationary window panel (17). The molding-side extension section (32b) overlaps the first support frame-side extension section (54a) in the vertical direction.

3 Claims, 7 Drawing Sheets

(51) Int. Cl.
  *B60R 13/04* (2006.01)
  *B60J 10/02* (2006.01)
  *B60J 10/04* (2006.01)

(56) References Cited

U.S. PATENT DOCUMENTS

| | | | |
|---|---|---|---|
| 6,422,639 B1 * | 7/2002 | Hemauer | 296/146.5 |
| 7,712,809 B2 * | 5/2010 | Lynam et al. | 296/1.11 |
| 8,898,958 B2 * | 12/2014 | Filipczak et al. | 49/502 |
| 9,010,841 B1 * | 4/2015 | Kwolek et al. | 296/146.7 |
| 2014/0059942 A1 * | 3/2014 | Goto | 49/502 |

FOREIGN PATENT DOCUMENTS

| | | | | |
|---|---|---|---|---|
| JP | 59-092214 | | 5/1984 | |
| JP | S60-179516 | | 11/1985 | |
| JP | 03208726 A | * | 9/1991 | B60J 5/04 |
| JP | 4729087 | | 4/2011 | |

\* cited by examiner

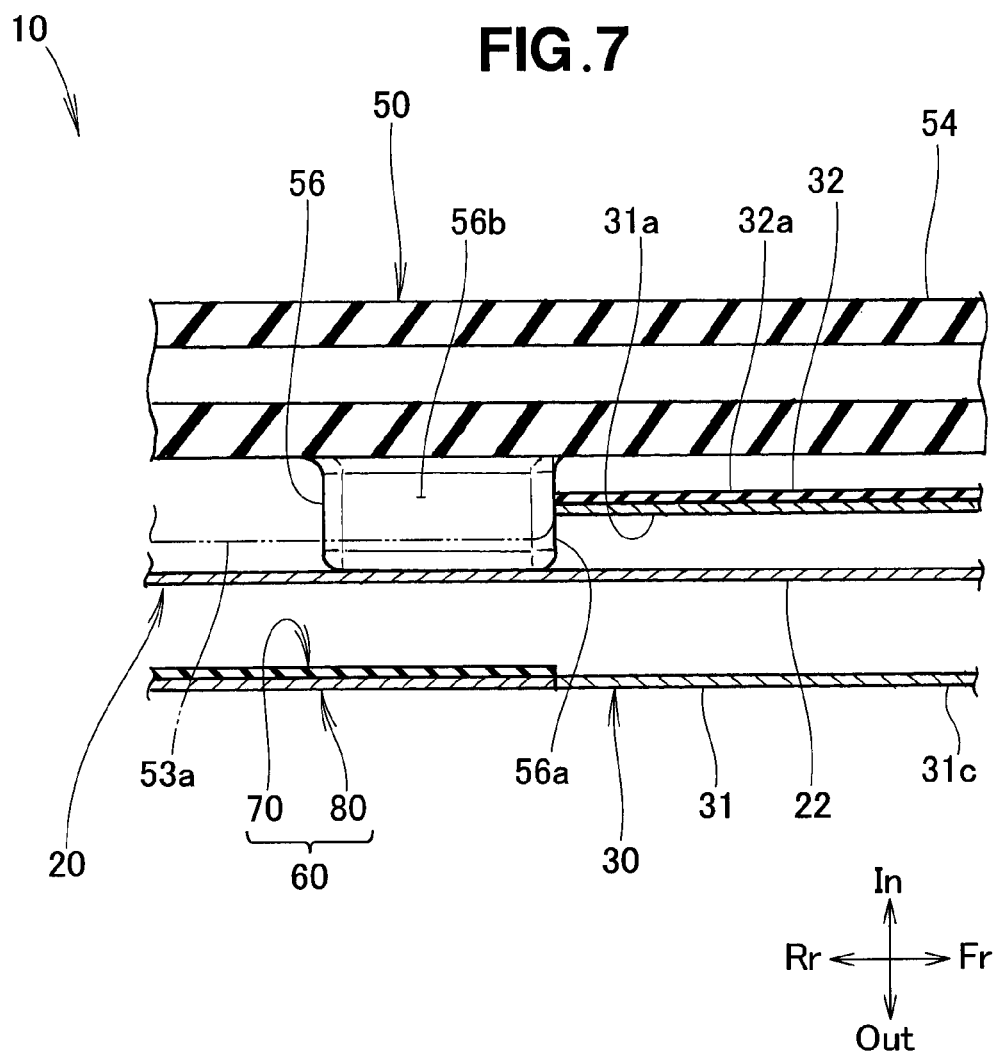

ns direction of the door from the design surface section
VEHICLE DOOR

TECHNICAL FIELD

The present invention relates to an improved vehicle door.

BACKGROUND ART

Vehicle doors are large components visible from outside of a vehicle, and therefore have large influence on design of the vehicle. For example, one of such vehicle doors is disclosed in Patent Literature 1.

In Patent Literature 1, a vehicle door as a rear door for a vehicle includes a door body, a door sash attached above the door body, an auxiliary sash extending vertically across an area formed by the door sash and the door body, a movable window panel vertically movably attached forward of the auxiliary sash, a panel support frame attached to a rear part of the door sash, a fixed window panel fixed in the panel support frame, and a beltline molding attached along an upper edge of the door body and extending in a longitudinal direction of the vehicle.

The fixed window panel is fixed in an immovable manner by the panel support frame. The beltline molding is arranged outward of a lower end of the panel support frame. That is, the fixed window panel and the beltline molding overlap each other in a thickness direction of the fixed window panel. However, if the fixed window panel and the beltline molding are merely arranged to overlap each other, a gap might occur therebetween. It is preferred that the vehicle door has no gap visible from outside to attain an enhanced external appearance.

PRIOR ART LITERATURE

Patent Literature

Patent Literature 1: Japanese Patent Publication No. 4729087

SUMMARY OF INVENTION

Technical Problems

It is therefore an object of the present invention to provide a vehicle door having an enhanced external appearance.

Solutions to Problems

According to the present invention, there is provided a vehicle door comprising a door body, a fixed window panel attached above the door body, a panel support frame provided at, at least, a lower edge of the fixed window panel to support the fixed window panel and seal a gap between the lower edge and the door body, and a beltline molding as a decoration member attached along an upper edge of the door body, characterized in that: the panel support frame and the beltline molding overlap each other in a thickness direction of the door; the panel support frame has a first support-frame-side extension section formed to extend in the thickness direction of the door from the fixed window panel toward the beltline molding; the beltline molding has a design surface section constituting an outer surface of the beltline molding, and a molding-side extension section formed to extend in the thickness direction of the door from the design surface section toward the fixed window panel; and the molding-side extension section overlaps the first support-frame-side extension section in a vertical direction.

Preferably, the vehicle door further comprises a support-shaped auxiliary sash that supports a side edge of the fixed window panel, the auxiliary sash and the beltline molding overlap each other in the thickness direction of the door, the first support-frame-side extension section has a sash adjacent part located adjacent to a lower end of the auxiliary sash and extending from the fixed window panel to a position same as an outer surface of the auxiliary sash, and a downward extension part formed to extend obliquely downward from the sash adjacent part to a distal edge of the first support-frame-side extension section, the molding-side extension section is laid over the downward extension part, and a distal edge of the molding-side extension section extends along a base edge of the downward extension part as an edge proximal to the sash adjacent part.

Preferably, the panel support frame further has a second support-frame-side extension section, the second support-frame-side extension section is located adjacent to the first support-frame-side extension section and formed to extend from the fixed window panel toward an extension line of the design surface section of the beltline molding, and an end in a longitudinal direction of the molding-side extension section is butted to a side edge of the second support-frame-side extension section in a longitudinal direction.

Preferably, the vehicle door further comprises a garnish that partly covers an outer surface of the fixed window panel over a range from a side edge to a lower edge of the fixed window panel, the garnish is located outward of the second support-frame-side extension section, and the garnish is butted to the design surface section of the beltline molding at a position where the second support-frame-side extension section and the molding-side extension section are butted to each other.

Preferably, the panel support frame is provided with a position regulating member arranged at a position below the second support-frame-side extension section, the position regulating member extends outward beyond an outer edge of the second support-frame-side extension section, and a distal end in a longitudinal direction of the design surface section abuts on the position regulating member.

Advantageous Effects of Invention

In the invention, the molding-side extension section overlaps the first support-frame-side extension section in a vertical direction. With this arrangement, when a boundary between the molding-side extension section and the first support-frame-side extension section is viewed from above, a gap between the molding-side extension section and the first support-frame-side extension section is inconspicuous, and thus the external appearance of the vehicle door can be enhanced.

Further, by thus arranging the molding-side extension section to overlap the first support-frame-side extension section, the gap therebetween can be minimized. As a result, generation of wind noise can be suppressed during traveling of the vehicle.

In the invention, the sash adjacent part fills a gap between the auxiliary sash and the molding-side extension section, and the downward extension part extends from the sash adjacent part toward the molding-side extension section. With this arrangement, the molding-side extension section that extends along the base edge of the downward extension part can be formed in a linear shape. The linear-shaped molding-side extension section can be formed by extrusion molding, which is a low cost molding method, and the manufacturing cost of the molding-side extension section can therefore be reduced.

Further, by thus forming the molding-side extension section located on an outer surface of the vehicle and visible from outside in the linear shape, the external appearance can be enhanced.

In the invention, the second support-frame-side extension section is located adjacent to the first support-frame-side extension section, and the end in the longitudinal direction of the molding-side extension section is butted to the side edge of the second support-frame-side extension section. That is, the second support-frame-side extension section is located adjacent to the first support-frame-side extension section and the molding-side extension section. With this arrangement, the panel support frame and the molding-side extension section can have an increased structural integrity, and the external appearance can thereby be enhanced.

In the invention, since the garnish is butted to the design surface section of the beltline molding at a position where the second support-frame-side extension section and the molding-side extension section are butted to each other, a distal end of the molding-side extension section and the distal end of the design surface section of the beltline molding can be aligned at a same position. Therefore, in advance of assembling the vehicle door, the beltline molding and the molding-side extension section can be joined together and cut at the same time at a predetermined position. By thus cutting the beltline molding and the molding-side extension section at the same time, the number of processes can be reduced compared with a case where they are cut separately, and the manufacturing cost of the vehicle door can thereby be reduced. Further, with a distal end of the garnish and the distal end of the design surface section being butted to each other, the garnish and the design surface section can have an integrated external appearance.

In the invention, the position regulating member is provided at the position below the second support-frame-side extension section, and the distal end in the longitudinal direction of the design surface section abuts on the position regulating member. The beltline molding can be arranged at an accurate position with the position regulating member. Since the position regulating member is located below the second support-frame-side extension section, the position regulating member is covered by the second support-frame-side extension section. In this manner, it is possible to enhance the external appearance by arranging the beltline molding at the accurate position with the position regulating member, while maintaining the good external appearance by arranging the position regulating member at the position not visible from outside.

BRIEF DESCRIPTION OF DRAWINGS

FIG. 7 is a cross-sectional view taken along line 7-7 of FIG. 3.

DESCRIPTION OF EMBODIMENT

Figure 1:
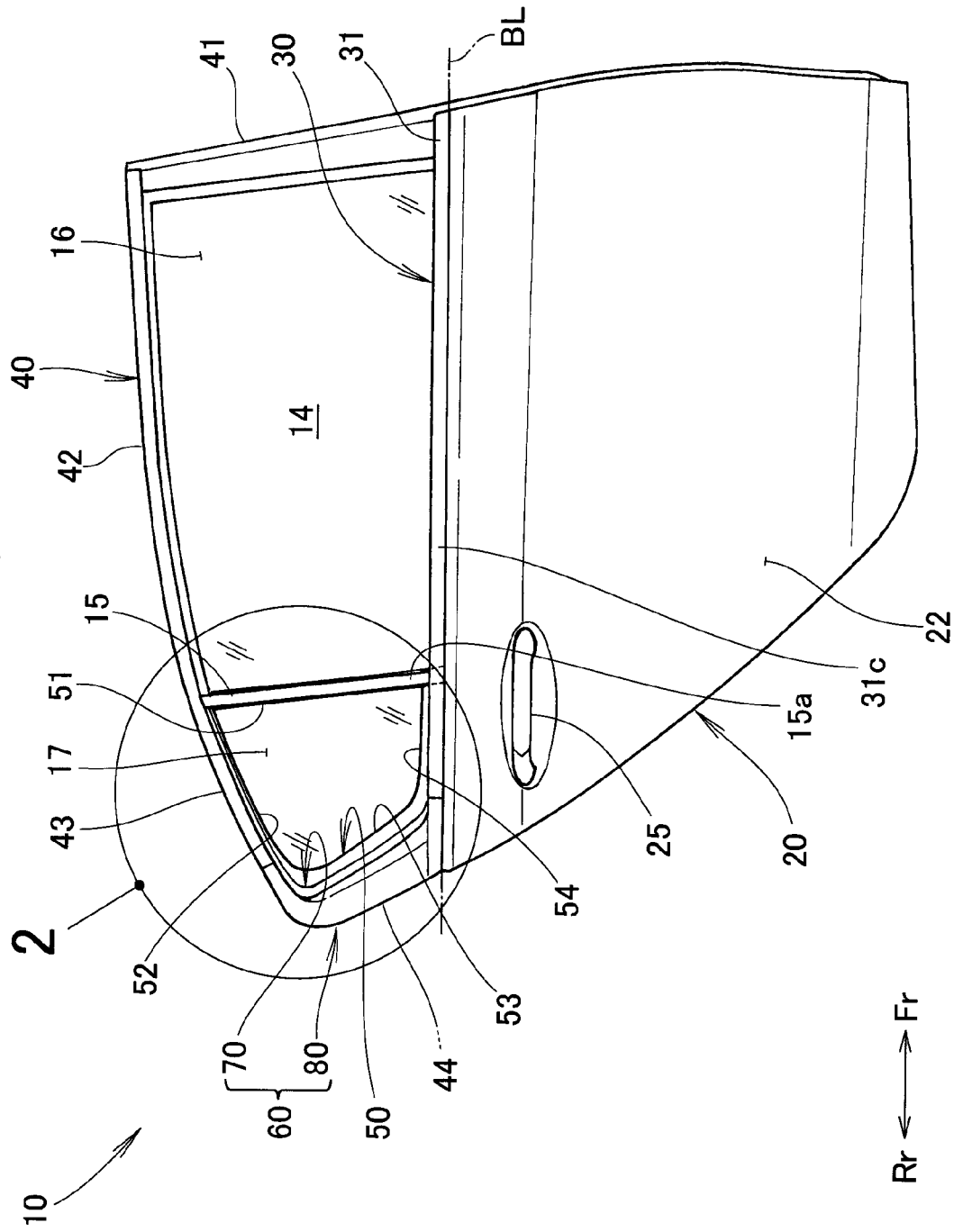
FIG. 1 is a view showing a vehicle door according to the present invention as viewed from outside of a vehicle.

A certain preferred embodiment of the present invention will be described in detail below with reference to the accompanying drawings. In the following description, the terms "left" and "right" are used to refer to directions as viewed from a human operator or driver in a vehicle, and the terms "front" and "rear" are used to refer to directions with respect to an advancing direction of the vehicle. In the drawings, "Fr", "Rr", "Out", "In", "Up", and "Dw" indicate respectively "forward", "rearward", "outward (direction toward the outside of the vehicle)", "inward (direction toward the inside of the vehicle)", "upward", and "downward".

Embodiment

Figure 2:
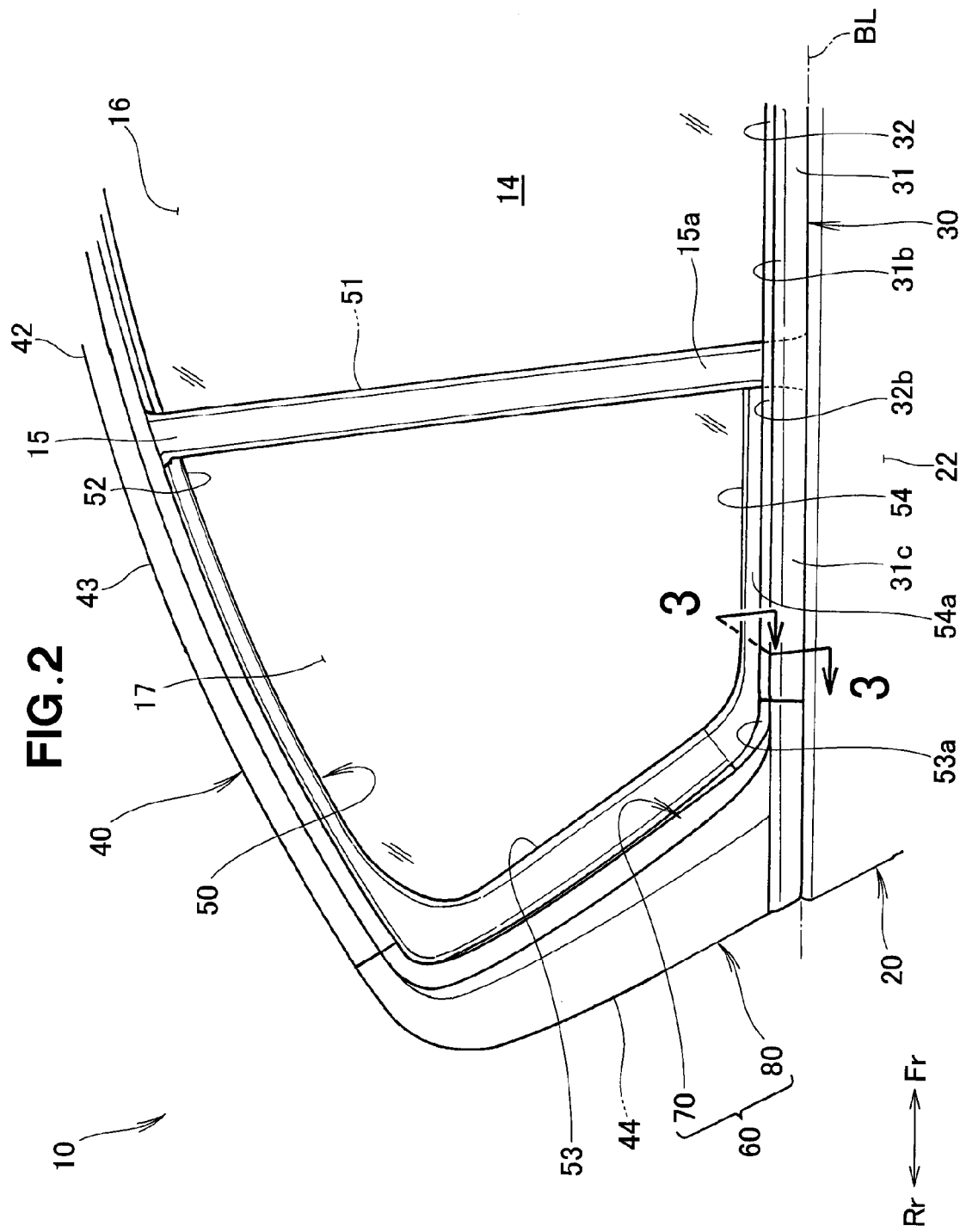
FIG. 2 is an enlarged view of section 2 of FIG. 1.

A vehicle door 10 shown in FIGS. 1 and 2 is a rear right door of a vehicle. The vehicle door 10 includes a door body 20 mounted in an openable/closable manner on a door opening formed in a rear part of a vehicle body, a belt line molding or beltline molding 30 attached along an upper edge of the door body 20, a door sash 40 arranged above the beltline molding 30, an auxiliary sash 15 partitioning a window opening 14 formed by the door sash 40 and the door body 20, a glass movable window panel 16 vertically movably attached forward of the auxiliary sash 15, a panel support frame 50 attached to an area enclosed by the auxiliary sash 15 and the door sash 40, a glass stationary window panel or fixed window panel 17 having an outer periphery thereof fixed in the panel support frame 50, and a garnish 60 with a molding attached to an outer surface of the door sash 40 at a position rearward of the fixed window panel 17.

A beltline BL shown in the drawings is a line extending along the upper edge of the door body 20 or a lower edge of the door sash 40. The beltline molding 30 is a decoration member extending along the beltline BL. The beltline molding 30 is attached to the door body 20.

Figure 3:
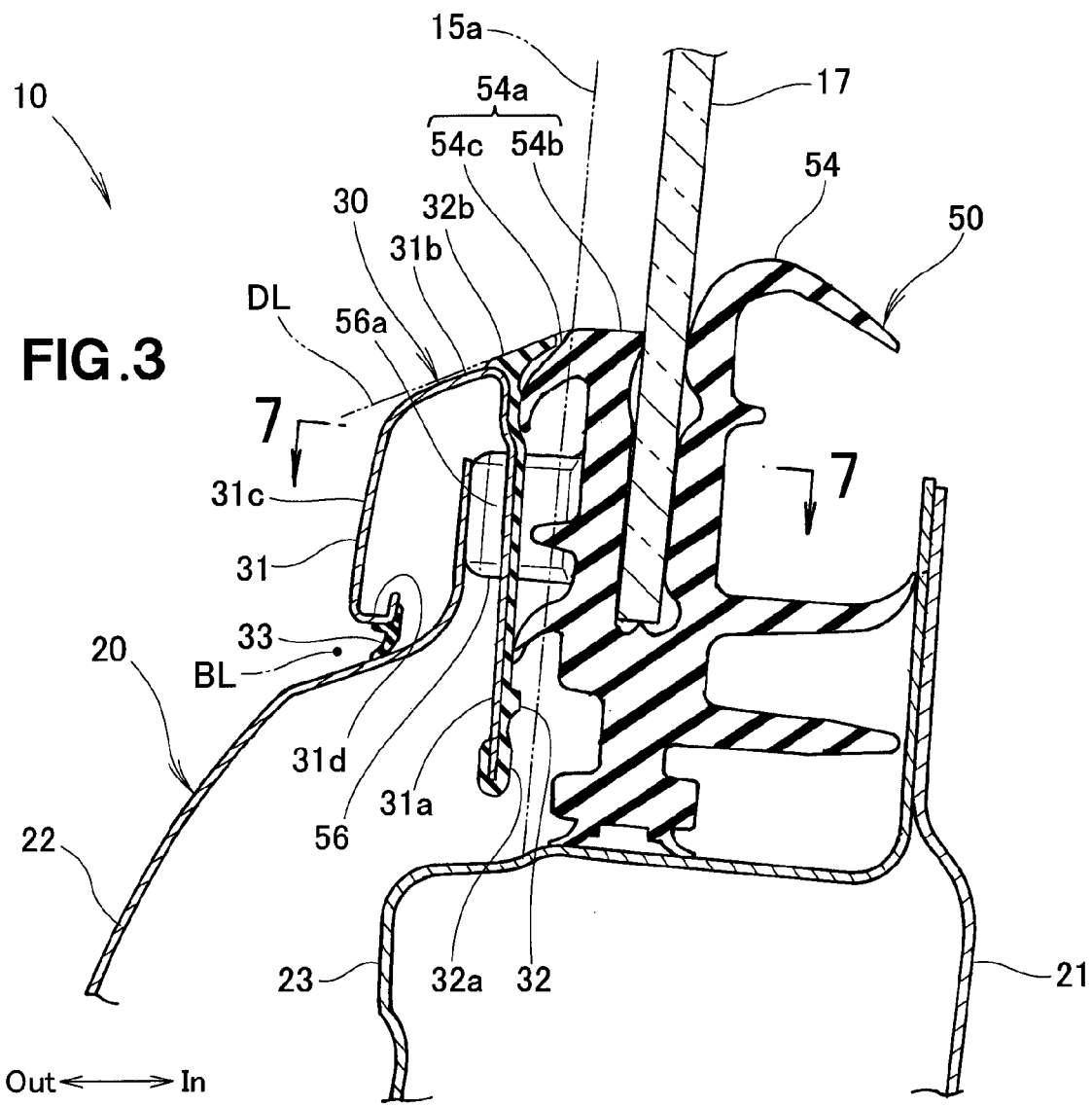
FIG. 3 is an enlarged cross-sectional view taken along line 3-3 of FIG. 2.

As shown in FIG. 3, the door body 20 includes an inner panel 21 facing the inside of the vehicle, an outer panel 22 constituting a design surface on the outside of the vehicle, and a stiffener 23 joined to an outer surface of the inner panel 21 to reinforce the inner panel 21. As shown in FIG. 1, a door handle 25, which is gripped by a driver to swing the vehicle door 10, is attached at a rear part of the outer panel 22.

As shown in FIG. 3, the beltline molding 30 includes a design surface section 31 arranged above the outer panel 22 and constituting an outer surface of the beltline molding 30, a T-shaped member 32 formed substantially in a T-shape and attached to the design surface section 31, and a beltline lip 33 attached to a lower part of the design surface section 31 and having a distal edge extending toward the outer panel 22.

As shown in FIGS. 1 and 2, the door sash 40 is a metal window frame formed to have a substantially pentagonal shape together with the beltline molding 30, and includes a front sash member 41 located forward of the movable window panel 16 and extending in a vertical direction, a front upper sash member 42 extending rearward from an upper end of the front sash member 41 to an upper part of the auxiliary sash 15, a rear upper sash member 43 extending obliquely downward from an rear end of the front upper sash member 42 along an upper edge of the fixed window panel 17, and a rear sash member 44 extending obliquely downward and forward from a rear end of the rear upper sash member 43 and covered by the garnish 60 with the molding.

The auxiliary sash 15 is a support-shaped member extending downward from a boundary between the front upper sash member 42 and the rear upper sash member 43. The auxiliary sash 15 has a lower end extending to a position overlapping with the beltline molding 30 as viewed in a thickness direction of the door. In other words, when the vehicle door 10 is viewed from outside, the lower end of the auxiliary sash 15 is covered by the beltline molding 30.

The panel support frame 50 is formed of a rubber material, and a gap between the fixed window panel 17 and the door body 20 is sealed by the panel support frame 50. The panel support frame 50 includes a front side part 51 extending in the vertical direction and covered by the auxiliary sash 15 as viewed from outside, an upper side part 52 extending obliquely rearward and downward from an upper end of the front side part 51, a lateral side part or rear side part 53 extending obliquely downward and forward from a rear end of the upper side part 52, and a lower side part 54 extending from a lower end of the rear side part 53 to a lower end of the front side part 51 along the beltline molding 30.

The panel support frame 50 is fitted to the entire outer periphery of the fixed window panel 17. The panel support frame 50 supporting the fixed window panel 17 is arranged above the door body 20. The fixed window panel 17 is thus arranged above the door body 20.

The garnish 60 with the molding is an exterior member formed substantially in a U-shape, and composed of a resin garnish main body or garnish body 70 attached to an outside of the door sash 40, and a metal molding 80 integrally attached to an outside of the garnish body 70.

The molding 80 is a decoration member for the garnish body 70. In the present invention, therefore, a garnish without the molding may be used instead of the garnish 60 with the molding.

As shown in FIG. 3, the design surface section of the beltline molding 30 includes an inner side wall part 31a located adjacent to the panel support frame 50 and extending vertically along the fixed window panel 17, an upper wall part 31b extending outward and downward from an upper edge of the inner side wall part 31a, an outer side wall part 31c extending downward from a lower edge of the upper wall part 31b, and a bent part 31d bent inward from a lower edge of the outer side wall part 31c.

The bent part 31d is formed substantially in an L-shape by being bent inward from the lower edge of the outer side wall part 31c, and provided with a beltline lip 33 attached to an L-shaped corner. By thus forming the bent part 31d, an edge part of the design surface section 31 does not appear on the outer surface, so that the vehicle door 10 can have an enhanced external appearance.

The T-shaped member 32 includes a T-shaped member leg section 32a (hereinbelow referred to simply as "leg section 32a") fitted along the inner side wall part 31a of the design surface section 31, and a molding-side extension section 32b formed at an upper end of the leg section 32a to extend in a thickness direction of the door from the design surface section 31 toward the fixed window panel 17. The leg section 32a has a lower end formed substantially in a U-shape and fitted to a lower edge of the inner side wall part 31a. The molding-side extension section 32b has a downward slope in a direction from the fixed window panel 17 to the outside of the vehicle.

The lower side part 54 of the panel support frame 50 has a first support-frame-side extension section 54a formed to extend in the thickness direction of the door from an outer surface of the fixed window panel 17 toward the beltline molding 30.

The first support-frame-side extension section 54a has a sash adjacent part 54b extending to a position same as an outer surface 15a of the auxiliary sash indicated by an imaginary line, and a downward extension part 54c extending obliquely downward from the sash adjacent part 54b to the molding-side extension section 32b. The downward extension part 54c extends outward below the molding-side extension section 32b. A distal edge of the downward extension part 54c abuts on the leg section 32a of the T-shaped member 32.

Figure 4:
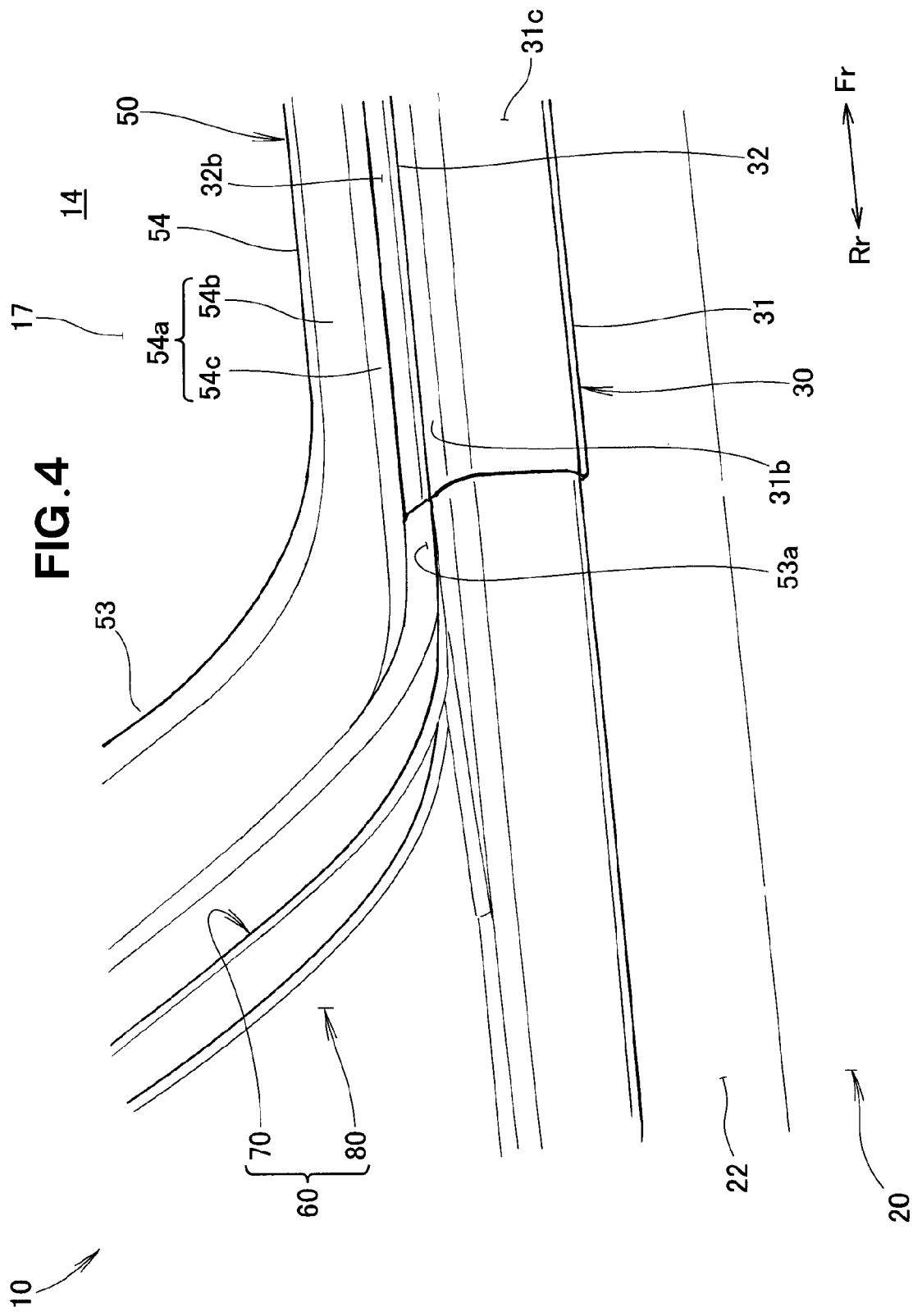
FIG. 4 is a perspective view showing a positional relationship between a molding, a garnish body, a beltline molding, and a panel support frame of FIG. 2.

As shown in FIG. 4, the molding-side extension section 32b overlaps the first support-frame-side extension section 54a in the vertical direction. With this arrangement, when a boundary between the molding-side extension section 32b and the first support-frame-side extension section 54a is viewed from above, a gap between the molding-side extension section 32b and the first support-frame-side extension section 54a is inconspicuous, and thus the external appearance of the vehicle door 10 can be enhanced. Additionally, by minimizing the gap, generation of wind noise can be suppressed during traveling of the vehicle.

Further, the sash adjacent part 54b fills a gap between the auxiliary sash 15 and the molding-side extension section 32b, and the downward extension part 54c extends from the sash adjacent part 54b toward the molding-side extension section 32b. With this arrangement, the molding-side extension section 32b that extends along a base edge of the downward extension part 54c can be formed in a linear shape. The linear-shaped molding-side extension section 32b can be formed by extrusion molding, which is a low cost molding method, and the manufacturing cost of the molding-side extension section 32b can therefore be reduced. Additionally, by thus forming the molding-side extension section 32b located on an outer surface of the vehicle and visible from outside in the linear shape, the external appearance can be enhanced.

The molding-side extension section 32b and the upper wall part 31b of the beltline molding 30 are formed continuously with each other along a line DL extending obliquely outward and downward from an outer edge of the sash adjacent part 54b. Thus, a step difference between the sash adjacent part 54b and the beltline molding 30 is minimized, and an upper surface of the beltline molding 30 is formed in a downward slope.

With this configuration, it is possible to prevent intrusion of rainwater etc. from a gap between the panel support frame 50 and the beltline molding 30, while allowing rainwater etc. to flow smoothly outward. Further, by forming continuously the sash adjacent part 54b, the molding-side extension section 32b, and the upper wall part 31b together, the external appearance of the vehicle door 10 can be enhanced.

The panel support frame 50 is provided with a position regulating member 56 formed integrally therewith to face outward. An upper edge of the outer panel 22 is in contact with an outer surface of the position regulating member 56, and a mounting position of the outer panel 22 is thereby regulated. The position regulating member 56 will be detailed with reference to FIGS. 5 and 6.

Figure 5:
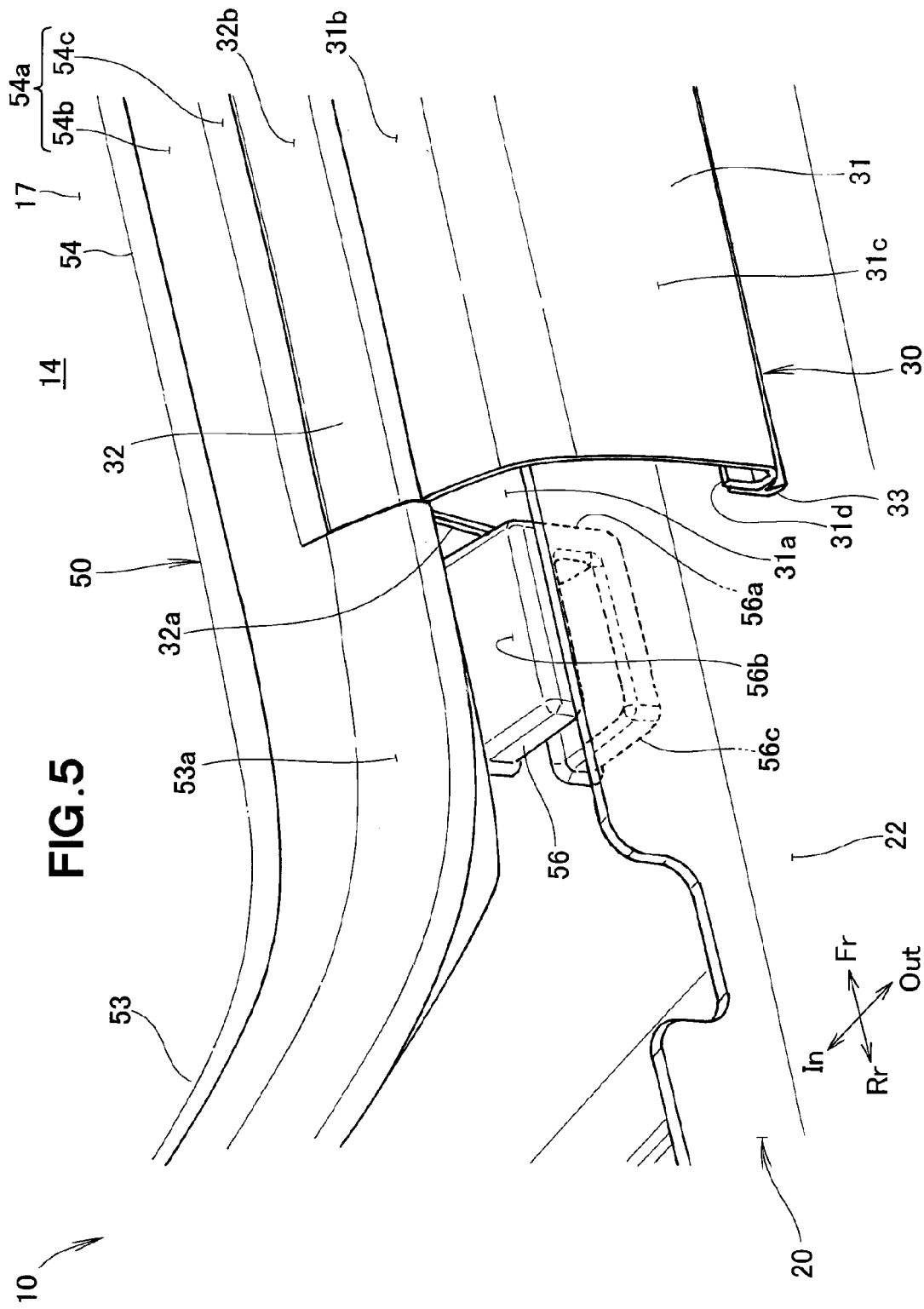
FIG. 5 is a perspective view of the vehicle door of FIG. 4 with the garnish and the molding removed.
Figure 6:
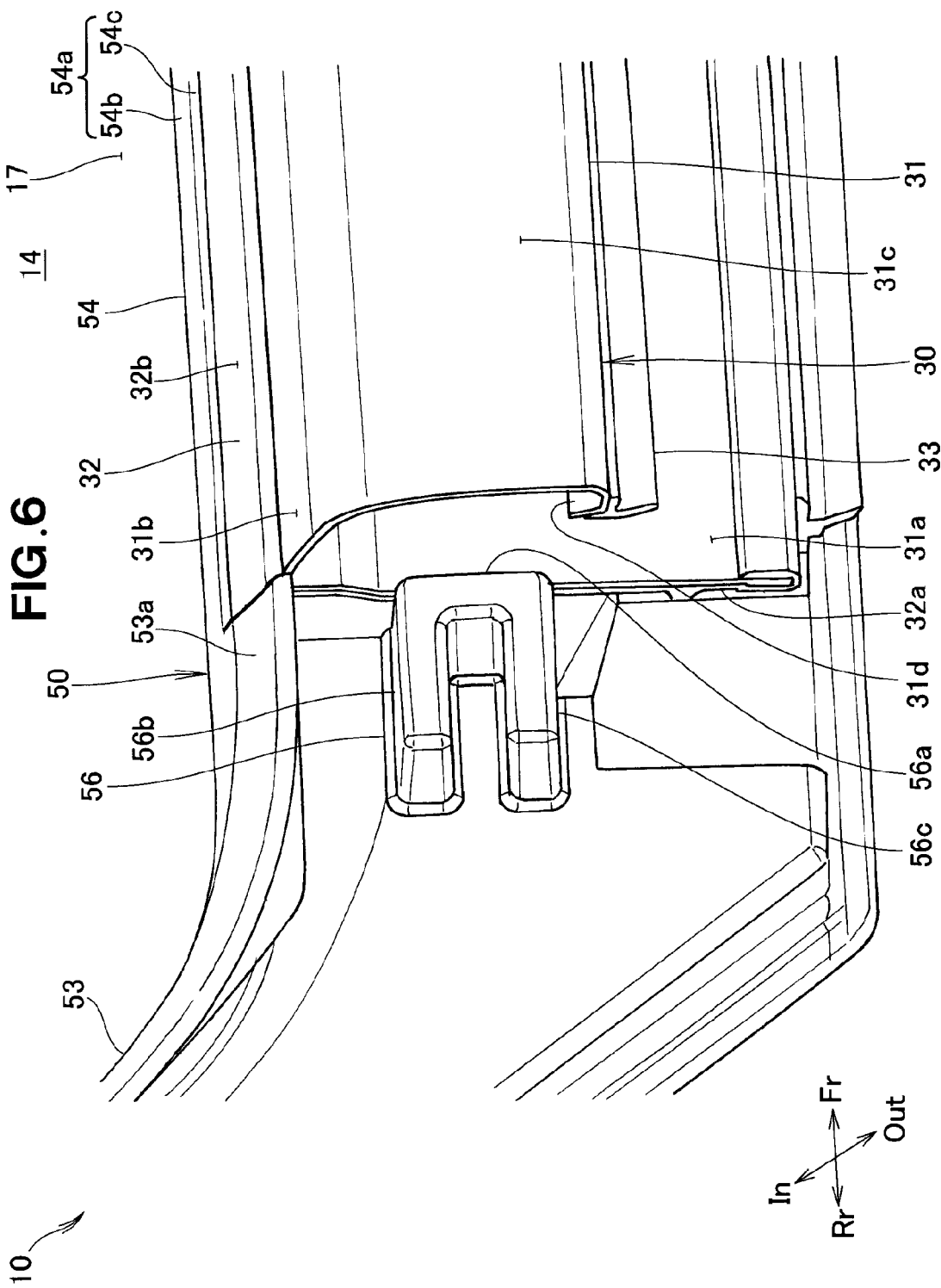
FIG. 6 is a perspective view of the vehicle door of FIG. 5 with an outer panel removed.

As shown in FIGS. 5 and 6, the position regulating member 56 is formed substantially in a U-shape, and has a vertical part 56a extending vertically, and horizontal parts 56b, 56c extending horizontally rearward from upper and lower ends of the vertical part 56a.

A rear end of the beltline molding 30 abuts on a front surface of the vertical part 56a. Thus, rearward movement of the rear end of the beltline molding 30 is regulated with the position regulating member 56. Also, the outer panel 22 abuts on outer surfaces of the vertical part 56a and the horizontal parts 56b, 56c. Thus, inward movement of the outer panel 22 is regulated with the position regulating member 56.

The rear side part 53 of the panel support frame 50 has a second support-frame-side extension section 53a located adjacent to the first support-frame-side extension section 54a and formed to extend from the fixed window panel 17 toward an extension line of the design surface section 31 of the beltline molding 30. A rear end of the molding-side extension section 32b is butted to a front side edge or front end of the second support-frame-side extension section 53a.

That is, the second support-frame-side extension section 53a is located adjacent to the first support-frame-side extension section 54a and the molding-side extension section 32. With this arrangement, the panel support frame 50 and the molding-side extension section 32b can have an increased structural integrity, and the external appearance can thereby be enhanced.

As shown in FIGS. 4 and 7, the garnish 60 with the molding is located outward of the second support-frame-side extension section 53a, and the molding 80 is butted to the design surface section 31 of the beltline molding 30 at a position where the second support-frame-side extension section 53a and the molding-side extension section 32b are butted to each other.

If a garnish without the molding is used, a distal end or front end of the garnish is butted to the design surface section of the beltline molding. That is, whether the garnish 60 with the molding or the garnish without the molding 80 is used, it is important that outer surfaces of the garnish and the design surface section 31 are made flush with each other.

Since the molding 80 and the design surface section 31 of the beltline molding 30 are butted to each other, and the second support-frame-side extension section 53a and the molding-side extension section 32b are butted to each other, the rear end of the molding-side extension section 32b and a distal end or rear end of the design surface section 31 of the beltline molding 30 can be aligned at a same position. Therefore, in advance of assembling the vehicle door 10, the beltline molding 30 and the molding-side extension section 32b can be joined together and cut at the same time at a predetermined position. By thus cutting the beltline molding 30 and the molding-side extension section 32b at the same time, the number of processes can be reduced compared with a case where they are cut separately, and the manufacturing cost of the vehicle door 10 can thereby be reduced. Further, with a front end of the garnish 60 with the molding and the rear end of the design surface section 31 being butted to each other, the garnish 60 and the design surface section 31 can have an integrated external appearance.

The panel support frame 50 is provided with the position regulating member 56 arranged at a position below the second support-frame-side extension section 53a. The position regulating member 56 extends outward beyond an outer edge of the second support-frame-side extension section 53a, and the rear end of the design surface section 31 abuts on the position regulating member 56.

Thus, the beltline molding 30 can be arranged at an accurate position with the position regulating member 56. Since the position regulating member 56 is located below the second support-frame-side extension section 53a, the position regulating member 56 is covered by the second support-frame-side extension section 53a. In this manner, it is possible to enhance the external appearance by arranging the beltline molding 30 at the accurate position with the position regulating member 56, while maintaining the good external appearance by arranging the position regulating member 56 at the position not visible from outside.

Although the embodiment has been explained in the case of the rear right door of the vehicle, however, it is not so limited, and the present invention may be applied to a rear left door or any other door on the vehicle.

Further, although the embodiment has been explained in the case of the swing type door, however, it is not so limited, and the present invention may be applied to a slide type door or other type vehicle doors.

INDUSTRIAL APPLICABILITY

The present invention is suitably used for doors mounted on rear lateral side parts of vehicles.

REFERENCE CHARACTERS

10 . . . vehicle door, 15 . . . auxiliary sash, 17 . . . fixed window panel, 20 . . . door body, 30 . . . beltline molding, 31 . . . design surface section, 32b . . . molding-side extension section, 50 . . . panel support frame, 53a . . . second support-frame-side extension section, 54a . . . first support-frame-side extension section, 54b . . . sash adjacent part, 54c . . . downward extension part, 56 . . . position regulating member, 60 . . . garnish with a molding (garnish)

The invention claimed is:

1. A vehicle door comprising:
a door body;
a fixed window panel attached above the door body;
a panel support frame provided at, at least, a lower edge of the fixed window panel to support the fixed window panel and seal a gap between the lower edge and the door body; and
a beltline molding as a decoration member attached along an upper edge of the door body,
wherein the panel support frame and the beltline molding overlap each other in a thickness direction of the door,
wherein the panel support frame has a first support-frame-side extension section formed to extend in the thickness direction of the door from the fixed window panel toward the beltline molding,
wherein the beltline molding has a design surface section constituting an outer surface of the beltline molding, and a molding-side extension section formed to extend in the thickness direction of the door from the design surface section toward the fixed window panel,
wherein the molding-side extension section overlaps the first support-frame-side extension section in a vertical direction,
wherein the panel support frame further has a second support-frame-side extension section,
wherein the second support-frame-side extension section is located adjacent to the first support-frame-side extension section and formed to extend from the fixed window panel toward an extension line of the design surface section of the beltline molding,
wherein an end in a longitudinal direction of the molding-side extension section is butted to a side edge of the second support-frame-side extension section in a longitudinal direction,
wherein the panel support frame is provided with a position regulating member arranged at a position below the second support-frame-side extension section,
wherein the position regulating member extends outward beyond an outer edge of the second support-frame-side extension section, and wherein a distal end in a longitudinal direction of the design surface section abuts on the position regulating member.

2. The vehicle door of claim 1, further comprising a support-shaped auxiliary sash that supports a side edge of the fixed window panel,
   wherein the auxiliary sash and the beltline molding overlap each other in the thickness direction of the door,
   wherein the first support-frame-side extension section has a sash adjacent part located adjacent to a lower end of the auxiliary sash and extending from the fixed window panel to a position same as an outer surface of the auxiliary sash, and a downward extension part formed to extend obliquely downward from the sash adjacent part to a distal edge of the first support-frame-side extension section,
   wherein the molding-side extension section is laid over the downward extension part, and
   wherein a distal edge of the molding-side extension section extends along a base edge of the downward extension part as an edge proximal to the sash adjacent part.

3. The vehicle door of claim 1, further comprising a garnish that partly covers an outer surface of the fixed window panel over a range from a side edge to a lower edge of the fixed window panel, wherein the garnish is located outward of the second support-frame-side extension section, and the garnish is butted to the design surface section of the beltline molding at a position where the second support-frame-side extension section and the molding-side extension section are butted to each other.

* * * * *